INVENTORS.
Robert G. Heitz
William E. Brown
Charles A. Levine
BY C. Kenneth Bjork
AGENT

United States Patent Office 3,476,602
Patented Nov. 4, 1969

3,476,602
BATTERY CELL
William E. Brown, Robert G. Heitz, and Charles A. Levine, Concord, Calif., assignors to The Dow Chemical Company, Midland, Mich., a corporation of Michigan
Filed July 25, 1966, Ser. No. 567,587
Int. Cl. H01m 35/10, 3/02
U.S. Cl. 136—6      4 Claims This invention relates to batteries and more particularly is concerned with a novel electrically rechargeable battery having a liquid anode and a liquid cathode.

Conventional rechargeable storage batteries which presently are used for operations requiring high power densities are the lead-acid, nickel-cadmium, nickel-iron, silver-zinc and silver-cadmium types. Of these, the lead-acid batteries are the most common particularly for automotive applications and other power applications requiring direct current of high drain and/or relatively long life. The rated capacity of the highest quality lead-acid batteries is about 130 amp-hrs. for 6-volt applications and 65 amp-hrs. for 12-volt battery applications, this being equivalent to about 15 watt-hours/pound of battery weight.

In the nickel-cadmium and nickel-iron type batteries correspondingly the capacity is about 11 watt-hours/pound of battery. Somewhat increased power densities are realized with the silver-zinc batteries (~85-100 watt-hours/pound) and silver-cadmium type (~50-75 watt-hours/pound) but it is apparent that the cost of the latter two batteries is undesirably high for many applications.

The conventional solid metal anode-cathode batteries of the art described directly hereinbefore have a relatively limited life as determined from discharge-charge cycles. This results from formation of dendrites in the solid metal electrode upon recharge, particularly when the cell is rapidly charged. These dendrites give structural weaknesses in the battery plates, massive metal spallation during service and ultimately complete loss of cell life. This problem is particularly bad in the silver-zinc and silver-cadmium type batteries where dendrite formation is so severe and rapid that this substantially eliminates such cells from consideration for use as secondary batteries. In these latter batteries, from a practical standpoint, they can be subjected at a maximum only to about 15 deep discharge-charge cycles. Therefore, these batteries are used in most applications only as primary cells.

It is a principal object of the present invention to provide a novel secondary battery.

It is a further object of the present invention to provide a novel electrically rechargeable battery having a markedly higher power density than realized heretofore.

It is also an object of the present invention to provide a novel battery cell which exhibits a power to size ratio and a power to weight ratio far greater than can be realized with conventional primary or secondary battery cells; e.g. equivalent to about 100 or more watt-hours/pound of battery weight.

It is a further object of the present invention to provide a battery cell capable of providing large energy drains for long periods of time thus providing a practical power source for vehicular propulsion.

It is also an object of the present invention to provide an electrically rechargeable battery which can be cyclically discharged and recharged many times without exhibiting degradation and which can be rapidly recharged.

These and other objects and advantages readily will become apparent from the detailed description presented hereinafter when read in conjunction with the figures of the drawing.

Figure 1:
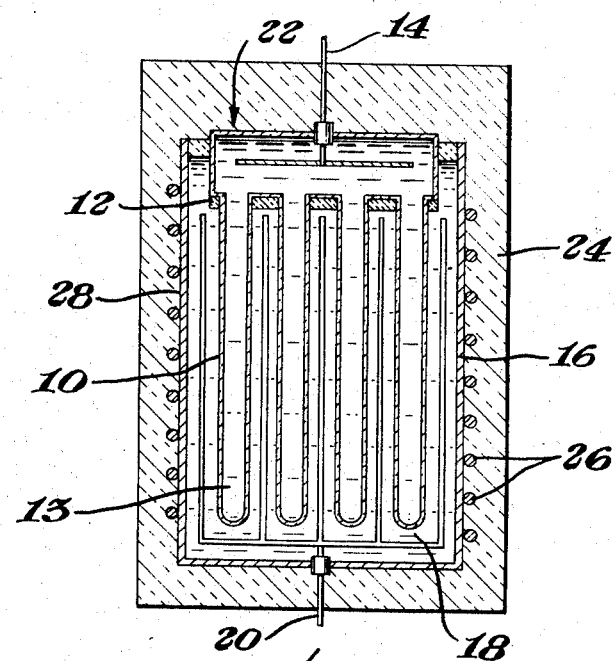
FIGURE 1 is a cross-sectional view of one embodiment of a battery of the present invention.

In general, the battery cell of the present invention comprises a liquid metal electrode as a fuel (i.e. oxidizable member), a second fluid, i.e. liquid or paste-like, electrode comprising an ion conducting mixture of ions from the metal of said first electrode dissolved with a non-aqueous anti-fuel (i.e. reducible member) and a substantially fluid tight electrolyte-membrane separating said first and second electrodes, said electrolyte-membrane being further characterized as being permeable to, i.e. transferring or otherwise passing, ions formed from the metal comprising the first electrode.

More particularly the present novel battery cell comprises a liquid anode (oxidizable member) of an alkali metal, a cathode (reducible member) comprising a non-aqueous, ion conducting liquid or fluid mixture containing in solution the alkali metal ion of the metal of the anode, and, a solid electrolyte (separator) intermediate the liquid anode and cathode materials. This separator is further characterized as transmitting ions of the anode metal between the anode and cathode compartments, but not substantially transmitting electrons, molecules of the anode metal or ions or molecular species of the cathode. The anode, cathode and electrolyte members are positioned in a liquid and vapor tight case. Electric lead assemblies connected to the anode and cathode complete the battery cell.

The present novel battery cell not only provides a high current density but also readily can be rapidly recharged without undergoing cell damage.

The battery cells can be fabricated as a complete unit comprising the electrolyte (separator) and electrodes in a liquid and vapor tight case. Conveniently the separator can be sealed in a case to provide separate anode and cathode compartments. The outer case or container, or at least the portion thereof comprising the cathode compartment, ordinarily is fabricated from an electron conducting material and is of a structural stability such that it does not degrade or detrimentally react with battery components during operation. Use of an electron conducting material provides for ready connection of cathode lead wires. Also, to assure the optimum of efficiency, the case is covered with a thermal insulating material to minimize heat losses both during cell operation and off-duty storage. Alternatively, a jacket of insulating material having heating wires or other type heating elements adjacent the case can be used to cover part of or the entire battery cell.

A preferred anode-cathode-electrolyte system of the present invention consists of a liquid sodium anode, a liquid sulfur-sodium sulfide mixture as cathode system, e.g. a sodium polysulfide, and a sodium ion conductive glass or ceramic electrolyte. This system is capable of producing energy densities of over 300 watt-hours per pound at operating temperatures as low as 330° C.

The term *anode* as used herein, in accordance with recognized electrochemical and electrical engineering practices denotes, when the cell is acting as a battery, i.e. delivering current to a load, the electrode at which current enters the bell. The term *cathode* denotes the electrode at which current leaves the cell.

Any of the alkali metals, i.e. lithium, sodium, potassium, rubidium, cesium, their amalgams, alloys and mixtures can be used as the anode. Sodium, potassium and their binary alloys ordinarily are employed. Sodium, as indicated hereinbefore, preferably is used as the anode in the present novel battery.

Cathode materials used in the present invention are non-aqueous, liquid reducible materials such as the elements sulfur, selenium, tellurium and compounds or anions such as tetracyanoethylene, para-thiocyanogen, ferricyanide and the like. Ordinarily, sulfur, selenium, tellurium and mixtures thereof are employed, sulfur being preferred. For those cathode materials which in the liquid state exhibit a high electrical resistivity, unexpectedly when an alkali metal salt is admixed therewith the requisite conductivity needed for operability when the battery is at or near full charge is provided. Usually to prepare such conductive mixtures, the salt used has a cation the same as that of the metal used for the anode and the anion is the same as that of the cathode material. Sodium sulfide dissolved in, or in admixture with, sulfur has been found to be particularly suitable for use in the practice of the present invention since these two components provide mixtures which become liquid at relatively low temperatures, e.g. at a minimum temperature of from about 270–330° C. and which also unexpectedly exhibit high electrical conductivity over wide compositional ranges.

With the preferred sulfur-sodium sulfide catholyte system, ordinarily when used in a secondary battery and the battery cell is at full charge, the catholyte mixture of sodium sulfide and sulfur has an empirical formula corresponding to the empirical formula $Na_2S_{22}$. As current is drawn from the cell and additional sodium sulfide is formed in the cathode compartment (by virtue of the sulfur being reduced and from migration of sodium ions), this mixture composition changes. Discharge ordinarily is stopped at or before the point when the mixture corresponds to the empirical formula $Na_2S_3$ to assure op rability at relatively moderately elevated temperatures. Even at this high sodium/sulfur ratio, the cathode mixture is liquid at temperatures as low as about 330° C. By stopping discharge at a catholyte composition corresponding to $Na_2S_4$, the minimum cell operating temperature can be reduced to about 285° C. However, if it is desired to operate at higher temperatures, the cell can be discharged to a catholyte composition corresponding to $Na_2S_2$ (liquid at about 560° C.), for example.

The novel liquid sodium metal-sodium polysulfide electrode system provides an exceptionally high energy density when compared with conventional anode-cathode systems. For example, if a cell having an initial sodium polysulfide composition of $Na_2S_{20}$ is discharged to a sodium-sulfur mixture corresponding to $Na_2S_3$ the energy density realized is about 306 watt-hours per pound combined anode and catholyte materials.

The electrical resistance of the antifuel materials themselves for the most part is exceptionally high. Molten sulfur, for example, has a resistivity reported to be in the range of $1 \times 10^{17}$ to $8 \times 10^{15}$ ohm-cm. Unexpectedly, with the disclosed specific liquid catholyte mixtures exceedingly low resistances are obtained. For illustrative purposes, representative conductances, expressed in reciprocal ohm-centimeters (ohm$^{-1}$=cm.$^{-1}$), of a number of liquid sodium sulfide-sulfur mixtures corresponding to various sodium polysulfide ($Na_2S_x$) compositions are presented in Table I which follows:

TABLE I.—SPECIFIC CONDUCTANCE

| | ohm$^{-1}$-cm.$^{-1}$, Temperature ° C. | | | | |
|---|---|---|---|---|---|
| | 280 | 300 | 320 | 340 | 360 |
| Sodium polysulfide composition: | | | | | |
| $Na_2S_4$ | 6.2 | 9.0 | 11.5 | 14.4 | >16 |
| $Na_2S_5$ | 7.1 | 9.6 | 12.0 | 13.8 | 14.6 |
| $Na_2S_8$ | 3.6 | 5.3 | 7.1 | 8.8 | 10.6 |
| $Na_2S_{12}$ | 3.3 | 4.8 | 6.3 | 7.8 | 9.4 |
| $Na_2S_{22}$ | 1.9 | 2.9 | 3.8 | 4.7 | 5.5 |

Electrolytes suitable for use in the battery cell of the present invention are those inorganic and organic polymeric which have the ability to keep the liquid anode and cathode materials separated, which are conductive in that they must be able to transmit ions of the anode metal between the anode compartment and the cathode compartment but do not substantially conduct (1) electrons, (2) the elemental metal anode (3) or the cathode material in either its molecular and/or ionic form. Additionally, the electrolyte should not be detrimentally degraded during operation and should be highly resistant to attack by other components of the battery cell. Further, this material should possess properties which will assure many cycles of charging and discharging of the battery cell. Preferably this material has a high ionic conductivity.

Electrolytes which have been found to be particularly suitable for use in the battery cell of the present invention include, for example, polycrystalline ceramics (such as the porcelains and glass ceramics), amorphous glasses and impregnated matrixes (such as porous glass or ceramic frits) in which have been embedded an essentially non-migrating salt or liquid which is substantially permeable only to the anode metal ion.

For optimum efficiency and operating life, ordinarily glass or ceramic electrolytes are fabricated utilizing relatively large proportions of the alkali metal oxide or alkali metal oxide former that is derived from the same alkali metal as that of the anode. With such electrolytes, there is markedly less tendency for strain and rupture in the electrolyte (separator) during cell operation than when the prime constituent of the alkali metal oxide in the glass is of a different material and thus of a different ionic size than the alkali metal of the anode. Ordinarily, alkali metal silicate glasses having a conductivity in the range of from about $10^{-3}$ to $10^{-6}$ or higher ohm$^{-1}$ cm.$^{-1}$ at about 250° C. are used as electrolyte. Specific examples of typical operable electrolytes include, for example, alkali metal silicate commercial glasses as well as alkali metal borate, -aluminate, -zirconate and the like glass materials.

As used in the battery cell, the electrolyte can be in the form of thin membranes fabricated in various orientations. These membranes can be in the form of flat plates, corrugated sheets, spirals or other designs which during operation will provide for anode metal ion transfer but will keep separate the liquid anode and cathode materials.

A preferred form for the electrolyte is fine, hollow fibers wherein the individual fibers have an outside diameter/wall thickness ratio of at least 3, ordinarily from about 3 to about 20 and preferably from about 4 to about 10. Usually within these ratios, fibers having an outside diameter from about 20 to about 1000 microns and a wall thickness of from about 5 to about 100 microns are used. Such hollow fibers provide a high strength, thin walled membrane and give a high ion conductivity. They also provide a very large surface area to volume ratio. Although less advantageous in the latter respect, fibers as large as 5000 microns outside diameter and having walls as thick as 1000 microns can be employed when fabricated from more highly ion conductive materials, e.g. certain porcelains.

For use in a battery cell, the hollow fibers can be fabricated into bundles of circular, rectangular prismatic or other geometric cross-sectional shapes which provide for a controlled orientation and substantially uniform spacing between fibers. The actual fabrication of the electrolyte fibers into a predetermined configuration readily can be carried out by one skilled in the art using known handling, packing and fabricating techniques. To illustrate, bundles of the fibers each having one end closed can be prepared wherein the open ends of the fibers are passed through and sealed into a common header which in turn either serves as or communicates with a reservoir for anode metal.

Glass and ceramic hollow fibers or other electrolyte (separators) can be sealed in place as a bundle in a header, for example, by adhesives such as glazing or potting compounds, solder glass, high temperature thermosetting resins and the like materials.

A battery cell of the present invention employing tubular hollow fibers as electrolyte as shown in FIGURE 1 illustrates one embodiment of the present invention. In this embodiment, a multiplicity of hollow glass fibers 10 fabricated from a conductive glass within the size range set forth hereinbefore and having their lower ends sealed off are positioned in parallel substantially uniformly spaced apart relationship and sealed into a common header 12. A molten alkali metal 13, for example sodium, substantially fills the hollows fibers and header. An anode lead 14 is positioned in the header 12 contacting the molten anode 13 and the assembly sealed. The anode-electrolyte (separator) assembly is placed in a container 16 which serves as a reservoir for the molten cathode 18 (e.g. sulfur having sodium sulfide in admixture therewith). A cathode lead assembly 20 is positioned within the vessel 16 in contact with the molten cathode material 18 and the entire battery assembly sealed with top assembly 22 so as to be vapor and liquid tight.

To assure that both the anode and cathode are maintained in the molten state ordinarily the vessel 16 is jacketed with an insulating cover 24. Alternatively, if desired, this cover 24 in turn can be fitted with an electrical resistance heater 26 adjacent the outer wall 28 of the vessel 16.

Figure 2:
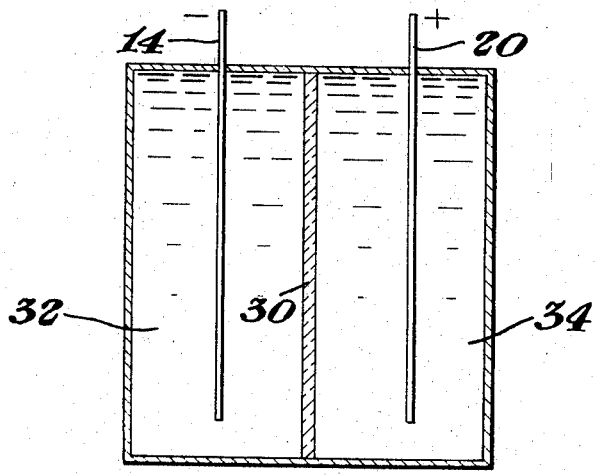
FIGURE 2 is a cross-sectional view of another embodiment of a battery cell of the present invention.

In a second embodiment of the battery as shown in FIGURE 2, the electrolyte (separator) 30 is in the form of a sheet like membrane. In this latter embodiment a single anode compartment 32, electrolyte (separator) 30, and cathode compartment 34 unit is illustrated.

It is to be understood that a multiplicity of such units of either of the embodiments illustrated can be assembled in series to give a battery cell capable of delivering a predetermined power output.

In operation of the battery cell of the present invention, as current is drawn from the battery the molten alkali metal anode gives up electrons and forms the corresponding metal ions. The electrons go through an external circuit doing work while the resultant alkali metal ions diffuse or otherwise are transported through the thin wall electrolyte separator and migrate toward the cathode. At the molten cathode, electrons are fed into the cathode chamber through the cathode lead from the external circuit forming anions with the molten cathode material, for example sulfur. These anions are, in effect, neutralized by reaction with the alkali metal ions migrating through the electrolyte (separator) thereby forming the alkali metal salt. This reaction continues through the discharge cycle of the battery.

To recharge the battery, a source of current is attached to the leads so as to feed electrons through the anode lead to the molten sodium anode and the positive lead from the power source is attached to the cathode lead of the battery. As the voltage of the power source is increased over the battery voltage, the exact reverse of the electrode reactions presented for the discharge cycle takes place. Alkali metal ions pass through the separator; alkali metal is regnerated and the reduced cathode material is oxidized to its original state. An unexpected advantage of the present system particularly when utilizing the sodium-sodium sulfide surfur electrodes is that much more rapid recharging of the battery can be carried out without any adverse affects. In conventional lead-acid storage batteries, permanent damage occurs unless a slow "trickle" charge is applied during the recharge cycle.

Although a preferred embodiment of the present battery is the rechargeable secondary type, the liquid anode-cathode system can be employed in either cells of the primary type or the secondary (rechargeable) type. With primary type cells, using a sulfur-alkali metal catholyte system, for example, at full charge the catholyte ordinarily has a higher sulfur concentration and battery operation is continued until discharged, i.e., until the power output falls off such an extent that the battery does not put out enough heat to maintain the anode and cathode in the fluid state required for operability. Applications for such a cathode system primarily are in batteries used in situations requiring a low current density and/or at remote, hard to reach installations. The actual cathode composition for such cells is limited only in that the requisite conductance is present in the charged battery. This offers the advantage for such uses of a high power output from a low battery weight. It is to be understood that even in such systems, the battery can be recharged.

Additionally, it is to be understood that if the fuel, e.g. liquid metal, and anti-fuel, e.g. liquid sulfur, are added during battery operation and if the resulting reaction product controllably is removed from the catholyte chamber so as to assure both the maintenance of a high concentration of the liquid anti-fuel and conductivity of the system the battery can be used as a fuel cell. In such operation the addition of the fuel and anti-fuel and removal of the reaction product can be made on a continuous or intermittent basis.

As indicated hereinbefore, operability of the present system is based upon the use of a liquid anode and liquid cathode system. It is entirely unexpected, as set forth hereinbefore, that an alkali metal salt would provide with a non-polar anti-fuel of the type listed hereinbefore an electrically conductive melt which when employed with a liquid metal fuel provides a battery cell of high charge density. However, good conductances are achieved thereby providing for the first time the use of low equivalent weight and economic electrode materials thus providing a marked advance in the battery art.

The following examples will serve to further illustrate the present invention but are not meant to limit it thereto.

EXAMPLE 1

A glass capillary having an inside diameter of about 320 microns and a wall thickness of from about 20 to about 30 microns with sealed bottom was made from a sodium silicate glass having a nominal composition of about $Na_2O \cdot 3SiO_2$ (specific resistance of about $10^4$ ohm-cm. at about 300° C.). This capillary was filled with metallic sodium. Conveniently, the sodium was introduced into the capillary by first substantially evacuating the capillary and sucking up molten sodium therein. This capillary was partially immersed in a molten mixture of 324 grams of sulfur and 19.5 grams of sodium sulfide ($Na_2S$), derived from heating 60 grams of $Na_2S \cdot 9H_2O$, at a temperature of about 299° C. This was equivalent to a sodium polysulfide cathode corresponding to the empirical formula ($Na_2S_{44}$). The depth of immersion of the capillary was such that 0.35 cm.² of the outside area of the capillary was immersed. An anode lead wire contacted the sodium and a cathode lead wire contacted the molten sulfur-sodium sulfide bath. The completed battery cell assembly was made vapor and liquid tight. A volt meter indicated an open circuit voltage of 2.1 volts. When a current of 0.034 milliampere (ma.) was drained from the cell, the terminal voltage dropped to 2.08 volts. The cell was alternately charged and discharged in five minute cycles for 21 hours using a current drain of 0.035–0.040 ma. (equivalent to 0.1 ma./cm.²) and a charging current of about the same magnitude. Over this test period, the cell was found to be substantially completely reversible in that the excess voltage needed for charging was about equal to the voltage drop on discharge at the same current.

The cell was charged and discharged in the same manner as described directly hereinbefore at a current of 0.1 ma. (0.28 ma./cm.²) for an additional 16 hours. During this test period, again the cell operated in a reversible manner.

EXAMPLE 2

A glass capillary similar to that described in Example 1 but having an inside diameter of about 480 microns and a 20–30 micron wall thickness was filled with sodium and immersed in a sulfur-sodium sulfide cathode system utilizing the same initial sodium polysulfide composition and following the same technique as described in Example 1. The area of the capillary immersed was about 0.53 cm.$^2$. This cell was alternately charged and discharged using 5 minute cycles while maintaining the temperature at between about 295 and 310° C. The charging and discharging currents were kept between 0.4 to 0.5 ma. (0.75 to 0.94 ma./cm.$^2$) and the terminal voltage on discharge was about 2.0 volts and upon charging was about 2.22 volts. This cell was operated for over 240 hours and over 2600 charge-discharge cycles and passed in excess of 89 ma.-hrs. (equivalent to >168 ma.-hrs./cm.$^2$) without showing any evidence of failure.

EXAMPLE 3

A glass capillary made from another soda lime glass, nominal composition of about 14 weight percent $Na_2O$, about 72 weight percent $SiO_2$, balance essentially CaO, having an inside diameter of about 400 microns and a wall thickness of about 20 microns was filled with sodium and placed in a molten bath of 50 weight percent $$Na_2S_5\text{---}50$$

weight percent sulfur (equivalent to a sodium polysulfide corresponding to about $Na_2S_{11}$) kept at a temperature between about 290 and 315° C. Electrode leads were affixed to the anode and cathode as described for Example 1. The cell was charged and discharged on 5 minute cycles at currents ranging from 0.006 to 0.018 ma. Terminal voltages dropped from the 2.12 open circuit voltage down to 1.13 volts on discharge with this higher resistance (about $10^6$ ohm-cm. at about 300° C.) glass. The cell operated over 8200 charge-discharge cycles (668 hours) and passed in excess of 7.67 milliampere-hours without showing any sign of degradation.

EXAMPLE 4

A glass capillary was drawn from a sodium silicate glass having a nominal composition of $Na_2O \cdot 2SiO_2$ and a specific resistance of about $10^3$ ohm-cm. at about 300° C. This capillary had an inside dimension of about 350 microns and a wall thickness of from 10 to 20 microns. The capillary was filled with sodium and partially immersed in a molten bath of sodium polysulfide corresponding to $Na_2S_5$. Electrode connections were made to the sodium anode and the sulfur-sodium sulfide cathode system and the unit sealed. About 0.38 cm.$^2$ of the glass capillary was immersed in the molten sodium sulfide bath which was maintained at about 290° C. Open circuit voltage of the cell was found to be 2.08 volts. The cell was charged for about 2 hours at a current of 0.4 milliampere (equivalent to 1 ma./cm.$^2$) and then placed on 5 minute cycles of charge and discharge. During this period, the current was maintained at 0.35 to 0.4 ma. over a 24 hour test time. The internal voltage drop in the cell was about 0.02 volt.

EXAMPLE 5

A glass capillary made from a potassium silicate glass, nominal composition $K_2O \cdot 4SiO_2$, having an outside diameter of about 400 microns and a wall thickness of about 20 microns was filled with potassium and placed in a molten bath of sulfur-potassium sulfide ($K_2S$), equivalent to potassium polysulfide corresponding to $$K_2S_8$$

maintained at from about 258 to 260° C. The specific resistivity of the glass was about $10^5$ ohm-cm. at this temperature. Electrode leads were affixed to the anode and cathode as described for Example 1. The initial open circuit voltage was 2.35 volts. The cell was discharged at a current drain of about 1 milliampere at 1.96 volts and was recharged at 1 milliampere current and an applied potential of 2.82 volts.

The cell was then discharged for 2.5 hours at a current drain of 0.1 ma. Recharging the cell overnight (about 18 hours) at 0.1 ma. provided an open circuit potential of about 2.42 volts. The cell was again discharged for about 8 hours at 0.05 ma. exhibiting an open circuit potential of about 2.45 at the end of this discharge period.

A second capillary was prepared from the same $K_2O \cdot 4SiO_2$ glass composition. This tube had an outside diameter of about 350 microns and a wall thickness of about 40 microns. A cell was completed using the liquid potassium anode-liquid sulfur cathode (sulfur was admixed with potassium sulfide to provide potassium polysulfide corresponding to $K_2S_8$). The system was maintained at about 242° C. and exhibited an initial open circuit potential of 2.39 volts. This cell was discharged and charged in five minute cycles at about 0.05 ma. current for a total of 258 hours. Over this period a total of 13 ma.-hours was passed by the cell.

EXAMPLE 6

A mixture consisting of ⅔ parts by weight of an equal molar mix of $Na_2SiO_3$, $SiO_2$ and $Al_2O_3$ with ⅓ part by weight of a clay mix of 1 part by weight Kentucky ball clay, 1.35 parts by weight Georgia Kaolin and 1.8 parts by weight flint was prepared and melted. The resulting product, after cooling and solidification, was broken, reground and then mixed with additional quantities of the clay mixture in the ratio of 1 part by weight to 8 parts clay mixture. Preparing a slip, extruding the slip into fibers and firing at 1180° C. produces porcelain fibers (having a specific resistance of about 730 ohm-cm. at about 400° C.) which are on the order of 500 microns outside diameter and having about 100 micron thick walls. Ten of these fibers each about 10 cms. long when sealed on one end and fastened into a common header through their open ends provide an anode compartment and electrolyte-separator assembly. The header fiber assembly can be sealed into a tube and the tubes and header compartment can be filled with sodium. A nickel wire inserted into the sodium in the header provides the anode lead. This unit can be inserted into a molten cathode of sulfur-sodium sulfide equivalent to a sodium polysulfide corresponding to the empirical formula $Na_2S_8$. A nickel wire in the $Na_2S_8$ cathode melt serves as the cathode lead. When the fibers are inserted into the molten cathode to a depth of about 5 cm., resulting in an immersed area of about 7.85 cm.$^2$, and the cell is maintained at about 400° C. it shows an open circuit voltage of about 2.1 volts. Drawing 10 milliamperes from the cell results in a cell voltage of 2.08 volts. A current drain of 100 milliamperes gives a cell voltage of 1.9 volts. This indicates an internal cell resistance of about 2 ohms. The cell is reversibly rechargeable. Charging at a current of 100 milliamperes (12.7 ma./cm.$^2$) takes an impressed voltage of 2.3 volts.

EXAMPLE 7

A glass of composition $Na_2Al_2Si_2O_8$ was made by dry milling in a jar mill an equimolar mixture of $Na_2SiO_3$, $Al_2O_3$ and $SiO_2$, firing the resulting mix at about 1100° C., and solidifying. The solid mass was broken and reground. About 186 grams of this glass was milled in a jar mill with 388 grams of Kentucky ball clay, 520 grams of Georgia kaolin, 820 milliliters of water and 0.5 gram $Na_2SiO_2$ (to deflocculate the slip). The resulting slip was cast into thimbles about 8 cm. long, about 0.5 cm. diameter and having a wall thickness of about 400 microns. These were fired at about 1350° C. to produce a porcelain electrolyte (separator) having about 2.5 percent sodium oxide content. The specific resistance of a porcelain thimble was measured and found to be $5.7 \times 10^4$ ohm-cm. at 300° C.; $3.7 \times 10^4$ ohm-cm. at 325° C. and $1.9 \times 10^4$ ohm-cm. at 350° C.

A cell was prepared by placing sodium in the thimble and immersing about 0.75 square cm. surface area of the tip in a liquid sulfur-sodium sulfide mixture having a nominal composition equivalent to a sodium polysulfide of about $Na_2S_4$. Initial open cell potential of the cell was about 1.92 volts. The cell was discharged at 0.4 ma./cm.$^2$ at 300° C. at a cell voltage of 1.0 volt. After heating the cell to 350° C., the cell produced 1.1 ma./cm.$^2$ at 1.0 volt.

In a separate study, a 99 percent $Al_2O_3$ porcelain was extruded into a tube having an outside diameter of about 1600 microns and a wall thickness of about 397 microns. This tubing had a specific resistance of $3.6 \times 10^7$ ohm-cm. at 300° C., $1.4 \times 10^7$ ohm-cm. at 325° C. and $6 \times 10^6$ ohm-cm. at 350° C. A cell was prepared as described in Example 1 using liquid sodium as the anode and liquid sulfur as cathode in admixture with sodium sulfide. The cathode system corresponded to sodium polysulfide of $Na_2S_4$. This cell at 300° C. exhibited an open cell potential of about 1.92 volts. It was discharged at 0.0008 ma./cm.$^2$ at 1.0 volt at 300° C. and 0.003 ma./cm.$^2$ at 1.0 volt at 350° C.

EXAMPLE 8

Following the same general technique and procedure as described in Example 1 a soft glass capillary

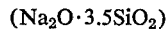

$(Na_2O \cdot 3.5SiO_2)$ filled with sodium and having an inside diameter of about 400 microns and a mean wall thickness of about 50 microns was inserted into a cathode melt of anhydrous sodium thiocyanate (NaSCN) at about 355° C. The depth of immersion was about 10 cm. corresponding to a capillary surface area in the molten NaSCN cathode melt of about 2 sq. cm. The resulting cell was charged at 20 ma. for about ten minutes. After this time, the open circuit voltage was measured and found to be 2.4 volts. This cell was discharged at 20 ma. for about 30 minutes, the open circuit voltage dropping to 1.6 volts. A further discharge for thirty minutes did not drop the open circuit voltage any further. This indicated a two-stage battery. This cell was charge-discharged several cycles at each of the two stages (2.4 volt open circuit and 1.6 volt open circuit) and was reversible in both cases. The internal resistance was from about 10 to about 16 ohms.

EXAMPLE 9

Using a soft glass capillary having a 40 micron wall thickness and a 400 micron outside diameter filled with sodium, a cell was prepared following the design described in Example 1 wherein a molten selenium-sodium selenide mixture corresponding to $Na_2Se_5$ was employed as the cathode system. The glass capillary was immersed to a depth of about 4 cm. providing a surface area of about 0.5 cm.$^2$ in the molten cathode material heated at a temperature of about 350° C. The open cell voltage was about 2.02 volts. The cell was reversibly charged and discharged for about a 48 hour period using a load of about 1.66 ma./cm.$^2$ during discharge.

EXAMPLE 10

A porcelain tube (low fired $Al_2O_3$) about 1400 microns outside diameter and about 400 microns thick was sealed into a 7 millimeter soft glass reservoir. The tube was filled with sodium and inserted into molten sodium polysulfide catholyte corresponding in composition to $Na_2S_4$. The cell was discharged at about 3.3 ma./cm.$^2$ at 300° C. After one hour the cell produced 13 ma./cm.$^2$ at 1 volt. The cell was recharged at 10 ma. for 5 minutes.

The cell was cooled to room temperature for two days and then reheated to 300° C. whereupon it produced 0.07 ma./cm.$^2$ at 1.0 volt.

EXAMPLE 11

A 2-volt cell can be prepared using liquid sodium as the anode and sodium polysulfide as the liquid cathode. This cell is designed to operate at a temperature of about 300° C. For this cell, about 540,000 conductive glass fibers each having an inside diameter of about 48.2 microns and a wall thickness of about 12.05 microns are placed in parallel relationship one to another to provide a center to center fiber spacing of about 192 microns. This occupies a cross-sectional area of about 20 square centimeters. The overall appearance of the parallel shaped fibers is a cylinder. The fibers are held in place by "cementing" with a low melting adhesive glass. The fibers are attached through one open end to a common header of a porcelain insulating flange by means of a low melting glass adhesive. The other end of each of the fibers is cut to a length of 8 inches and sealed off by heating. The so-fabricated cell bundle, designed to provide an effective area of glass in the battery cell of about 61 cm.$^2$/cubic cm. of the cell, can be placed in a metal container which also serves as a cathode reservoir. The internal IR loss (voltage drop) from the glass is about 0.13 volt at 1 ma./cm.$^2$. Lead wires are attached to the anode assembly and to the metal case holding the cathode. The case can be filled under a reduced pressure with a predetermined amount of a liquid sulfur-sodium sulfide mixture to provide a sulfur-sodium sulfide composition corresponding to $Na_2S_{22}$. The volume of the liquid cathode is 0.89 cubic centimeter per cubic centimeter of the cell. The assembly of the glass tubes and insulating flange can be fastened to a header compartment and this assembly filled with liquid sodium also under a reduced pressure. Connections for the lead wires are affixed to the anode and cathode compartments. The container seals for the latter unit are constructed so as to be vapor and liquid tight.

Multiples of these cells can be connected in series to give batteries of predetermined voltage for a variety of uses. To illustrate, 120 of these cells can be connected in a combination of parallel and series arrangement to provide a power source capable of delivering 6 kilowatts for 7 hours at about 60 volts.

In order to assure maintenance of the operating temperature, utilization of 2 inches of glass wool insulation or its equivalent around the cell prevents complete discharge of the battery even if idled for as long as a 24 hour period.

The battery is reversibly rechargeable and shows no degradation after many hundreds of discharge-charge cycles.

EXAMPLE 12

By following the procedures set forth for the preceding examples, a battery can be prepared using a liquid lithium anode and a liquid sulfur-lithium sulfide cathode system. In this system for optimum in performance, an inert atmosphere, e.g. argon, is utilized above the liquid anode to eliminate any possibility of anode contamination by reaction with the atmosphere.

In a manner similar to that described for the foregong examples, rechargeable battery cells of high power volume densities providing from as high as 40,000 watt-hours or more can readily be fabricated. These can be in the form of cylinders, rectangular cells or other configurations practical for a given installation. Further, it is to be understood that any of the described fuels can be used with any of the described anti-fuels in the practice of the present invention.

Various modifications can be made in the invention without departing from the spirit or scope thereof for it is understood that we limit ourselves only as defined in the appended claims.

We claim:
1. In a battery cell comprising a first oxidizable liquid metal electrode, a second fluid reducible electrode and a substantially fluid tight electrolyte (separator) separating said first and second electrodes, said electrolyte (separator) being further characterized as passing ions formed from the metal comprising the first electrode, the improvement which comprises providing said electrolyte (separator) in the form of fine hollow fibers, said fibers having an outside diameter/wall thickness ratio of at least 3, rang- ing in outside diameter from about 20 to 5000 microns and having a wall thickness of from about 5 to about 1000 microns.

2. The improvement in battery cells as defined in claim 1 wherein the hollow fibers range in outside diameter from about 20 to about 1000 microns and have a wall thickness of from about 5 to about 100 microns.

3. The improvement in a battery cell as defined in claim 2 wherein the hollow fibers are prepared from glass and said fibers have an outside diameter/wall thickness ratio of from about 4 to about 25.

4. The improvement in a battery cell as defined in claim 1 wherein the hollow fibers are porcelain.

References Cited
UNITED STATES PATENTS

| | | | |
|---|---|---|---|
| 3,043,896 | 7/1962 | Herbert et al. | 136—6 |
| 3,214,296 | 10/1965 | Smatko | 136—6 |
| 3,245,836 | 4/1966 | Agruss | 136—83 |
| 3,248,265 | 4/1966 | Herbert | 136—6 |
| 3,253,955 | 5/1966 | Clampitt | 136—83 |

WINSTON A. DOUGLAS, Primary Examiner
A. SKAPARS, Assistant Examiner

U.S. Cl. X.R.
136—83